(12) United States Patent
Shih et al.

(10) Patent No.: US 11,207,916 B2
(45) Date of Patent: Dec. 28, 2021

(54) COUPLING MECHANISM AND SUPPORTING ASSEMBLY INCLUDING THE SAME

(71) Applicant: Other World Computing, Inc., Woodstock, IL (US)

(72) Inventors: I-Ching Shih, New Taipei (TW); Chao-Nan Huang, New Taipei (TW)

(73) Assignee: Other World Computing, Inc., Woodstock, IL (US)

( * ) Notice: Subject to any disclaimer, the term of this patent is extended or adjusted under 35 U.S.C. 154(b) by 15 days.

(21) Appl. No.: 16/882,937

(22) Filed: May 26, 2020

(65) Prior Publication Data
US 2021/0370718 A1    Dec. 2, 2021

(51) Int. Cl.
*B60B 33/00* (2006.01)
*F16B 43/00* (2006.01)

(52) U.S. Cl.
CPC ...... *B60B 33/0018* (2013.01); *B60B 33/0042* (2013.01); *F16B 43/004* (2013.01); *F16B 43/005* (2013.01)

(58) Field of Classification Search
CPC ............ B60B 33/0042; B60B 33/0002; B60B 33/0005; B60B 33/0007; B60B 33/001; B60B 33/0015; B60B 33/0018; B60B 33/0021; B60B 33/0023; B60B 33/0026; F16B 43/004; F16B 43/005; A47B 91/06; A47B 91/04; A47B 91/066; A47B 91/12; A47B 91/00; A47B 91/005; A47B 2091/007; A47B 91/026
See application file for complete search history.

(56) References Cited

U.S. PATENT DOCUMENTS

| | | | | |
|---|---|---|---|---|
| 2,476,366 A | * | 7/1949 | Grimm | A47B 91/026 248/188.4 |
| 2,476,381 A | * | 7/1949 | Peavey | A47B 91/026 248/188.4 |
| 3,463,505 A | * | 8/1969 | Chervitz | B60B 33/0002 280/79.2 |
| 5,496,142 A | * | 3/1996 | Fodor | F16B 43/004 411/544 |
| 5,742,977 A | * | 4/1998 | Hoofe, III | B60B 33/0002 16/30 |
| 5,809,612 A | * | 9/1998 | Finch | B60B 33/0007 16/21 |
| 5,983,464 A | * | 11/1999 | Bauer | A45C 13/1069 24/303 |
| 6,588,059 B1 | * | 7/2003 | McCord | B60B 33/0002 16/18 R |

(Continued)

*Primary Examiner* — Jeffrey O'Brien
(74) *Attorney, Agent, or Firm* — Hammer & Associates, P.C.

(57) ABSTRACT

A coupling mechanism is provided for coupling a supporting element to a frame, and includes a base member and a C-shaped retainer. The frame includes a frame body and a leg member that has a leg body extending downwardly from the frame body to terminate at an enlarged leg end. The base member defines therein a recess for the enlarged leg end therein. The supporting element is coupled to a lower major surface of the base wall. The C-shaped retainer extends to be disposed about the leg body, and is configured to be detachably coupled to a surrounding wall of the base member for retaining the enlarged leg end in the recess.

8 Claims, 5 Drawing Sheets

(56) References Cited

U.S. PATENT DOCUMENTS

| | | | | |
|---|---|---|---|---|
| 6,626,405 B1* | 9/2003 | Keast | A47B 91/06 | 16/42 R |
| 6,834,746 B1* | 12/2004 | Lin | B60B 33/0018 | 16/35 R |
| 6,869,052 B2* | 3/2005 | Keast | A47B 91/06 | 16/42 R |
| 7,249,738 B2* | 7/2007 | Kaczorowski | B60B 33/0002 | 248/129 |
| 7,389,567 B2* | 6/2008 | Rogers | A42B 1/24 | 24/113 R |
| 7,610,655 B2* | 11/2009 | Thaw | A47B 91/066 | 16/30 |
| 7,757,346 B2* | 7/2010 | Chase | A47B 91/06 | 16/42 R |
| 7,770,853 B2* | 8/2010 | Shiftier | A47B 91/06 | 248/188.9 |
| 8,037,574 B2* | 10/2011 | Chase | A47B 91/06 | 16/42 R |
| 8,100,538 B2* | 1/2012 | Kuroda | G03B 21/145 | 353/70 |
| 8,302,256 B1* | 11/2012 | Spraley | B60B 33/0018 | 16/30 |
| 8,535,184 B2* | 9/2013 | Pastore | B60B 33/0049 | 473/478 |
| 8,671,519 B1* | 3/2014 | Spraley | B60B 33/001 | 16/30 |
| 8,881,345 B2* | 11/2014 | Franze | B60B 33/0018 | 16/30 |
| 8,997,312 B1* | 4/2015 | Harris | B60B 33/0002 | 16/29 |
| 9,027,204 B2* | 5/2015 | Frame | B60B 33/0021 | 16/47 |
| 9,221,300 B1* | 12/2015 | Pastore | B60B 33/0039 | |
| 9,221,301 B1* | 12/2015 | Pastore | B60B 33/02 | |
| 9,237,807 B1* | 1/2016 | Amber | A47B 91/06 | |
| 9,428,008 B2* | 8/2016 | Carpinella | B60B 33/0002 | |
| 9,592,703 B1* | 3/2017 | Groppe | B60B 33/04 | |
| 9,894,995 B2* | 2/2018 | Downs | A47B 91/12 | |
| 9,950,563 B2* | 4/2018 | Tsai | B60B 33/001 | |
| 10,070,697 B1* | 9/2018 | Melgoza | A44C 3/001 | |
| 10,288,095 B2* | 5/2019 | Lamontagne | G02B 7/026 | |
| 10,499,554 B2* | 12/2019 | Sudbrink | A01B 76/00 | |
| 10,668,771 B2* | 6/2020 | Cherian | B60B 33/08 | |
| 2008/0245944 A1* | 10/2008 | Chase | A47C 7/002 | 248/346.11 |
| 2011/0191985 A1* | 8/2011 | Hirth | A47C 7/002 | 16/42 R |
| 2011/0197390 A1* | 8/2011 | Carpinella | A47B 91/066 | 16/30 |
| 2011/0298227 A1* | 12/2011 | Fiedler | E05B 47/004 | 292/251.5 |
| 2012/0093611 A1* | 4/2012 | Knight, Jr. | F16B 43/005 | 411/368 |
| 2015/0040346 A1* | 2/2015 | Tsai | B60B 33/0021 | 16/45 |
| 2018/0257431 A1* | 9/2018 | Cheng | B60B 33/0021 | |
| 2020/0122504 A1* | 4/2020 | Huang | B60B 33/0005 | |
| 2020/0262240 A1* | 8/2020 | Leonard | B60B 33/0023 | |
| 2021/0053395 A1* | 2/2021 | Brischke | B60B 33/0068 | |
| 2021/0120953 A1* | 4/2021 | Bouche | A47B 9/14 | |
| 2021/0213777 A1* | 7/2021 | Kim | B62B 3/00 | |

* cited by examiner

COUPLING MECHANISM AND SUPPORTING ASSEMBLY INCLUDING THE SAME

FIELD

The disclosure relates to a coupling mechanism, more particularly to a coupling mechanism for coupling a supporting element to a frame.

BACKGROUND

CN 206224362U discloses a foot pad for a notebook computer. The foot pad is used to elevate the notebook computer for facilitating heat dissipation of the notebook computer. The dimension of the foot pad in a height direction is variable, and thus, the height of the notebook computer is adjustable by the foot pad.

CN 109506104 A discloses a computer damping base including a frame body, a heat-dissipation fan mounted above the frame body, a support panel disposed in the frame body, and a first base body disposed beneath the frame body. Four support legs are detachably mounted beneath a bottom surface of the first base body at four corners thereof. Four universal wheels are provided at bottom ends of the support legs.

SUMMARY

An object of the disclosure is to provide a novel coupling mechanism for coupling a supporting element to a frame, and to provide a novel supporting assembly including the coupling mechanism and the supporting element. With the provision of the supporting assembly, the supporting element may be rapidly detached relative to the frame without using any hand tools.

According to a first aspect of the disclosure, a coupling mechanism is provided for coupling a supporting element to a frame, and includes a base member and a C-shaped retainer. The frame includes a frame body and a leg member that has a leg body extending downwardly from the frame body to terminate at an enlarged leg end. The base member includes a base wall and a surrounding wall. The base wall has an upper major surface and a lower major surface which is configured for being coupled to the supporting element. The surrounding wall extends upwardly from a marginal edge of the upper major surface of the base wall to define a recess with the base wall. The C-shaped retainer extends to be disposed about the leg body, and is configured to be detachably coupled to the surrounding wall for retaining the enlarged leg end in the recess.

According to a second aspect of the disclosure, a supporting assembly for a frame includes a base member, a supporting element, and a C-shaped retainer. The frame includes a frame body and a leg member that has a leg body extending downwardly from the frame body to terminate at an enlarged leg end. The base member includes a base wall and a surrounding wall. The base wall has an upper major surface and a lower major surface. The surrounding wall extends upwardly from a marginal edge of the upper major surface of the base wall to define a recess with the base wall. The supporting element is configured to be coupled to the lower major surface of the base wall. The C-shaped retainer extends to be disposed about the leg body, and is configured to be detachably coupled to the surrounding wall for retaining the enlarged leg end in the recess.

BRIEF DESCRIPTION OF THE DRAWINGS

Other features and advantages of the disclosure will become apparent in the following detailed description of the embodiment (s) with reference to the accompanying drawings, in which.

DETAILED DESCRIPTION

Figure 1:
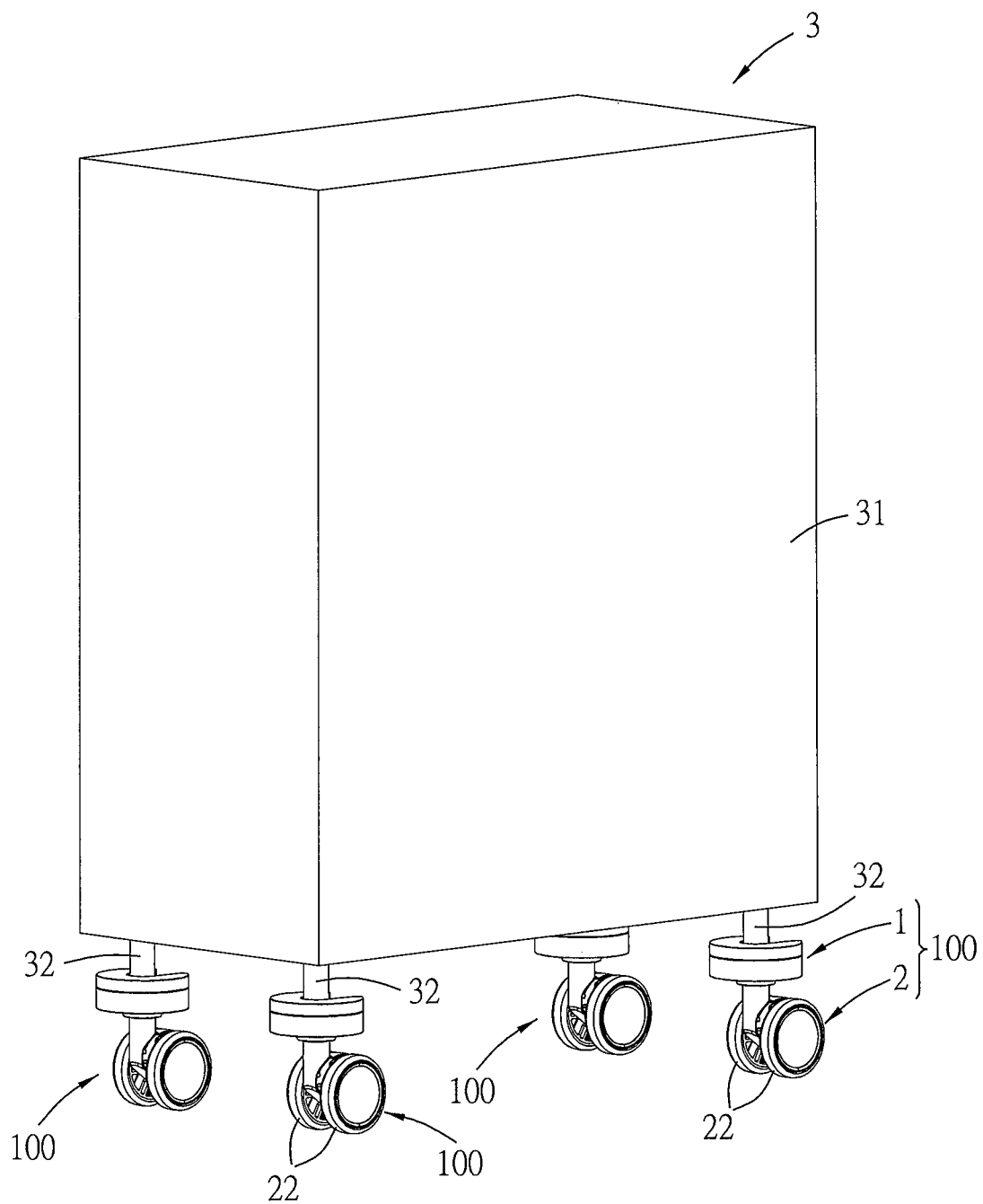
FIG. 1 is a perspective view illustrating a frame mounted with a plurality of supporting assemblies according to an embodiment of the disclosure.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 2:
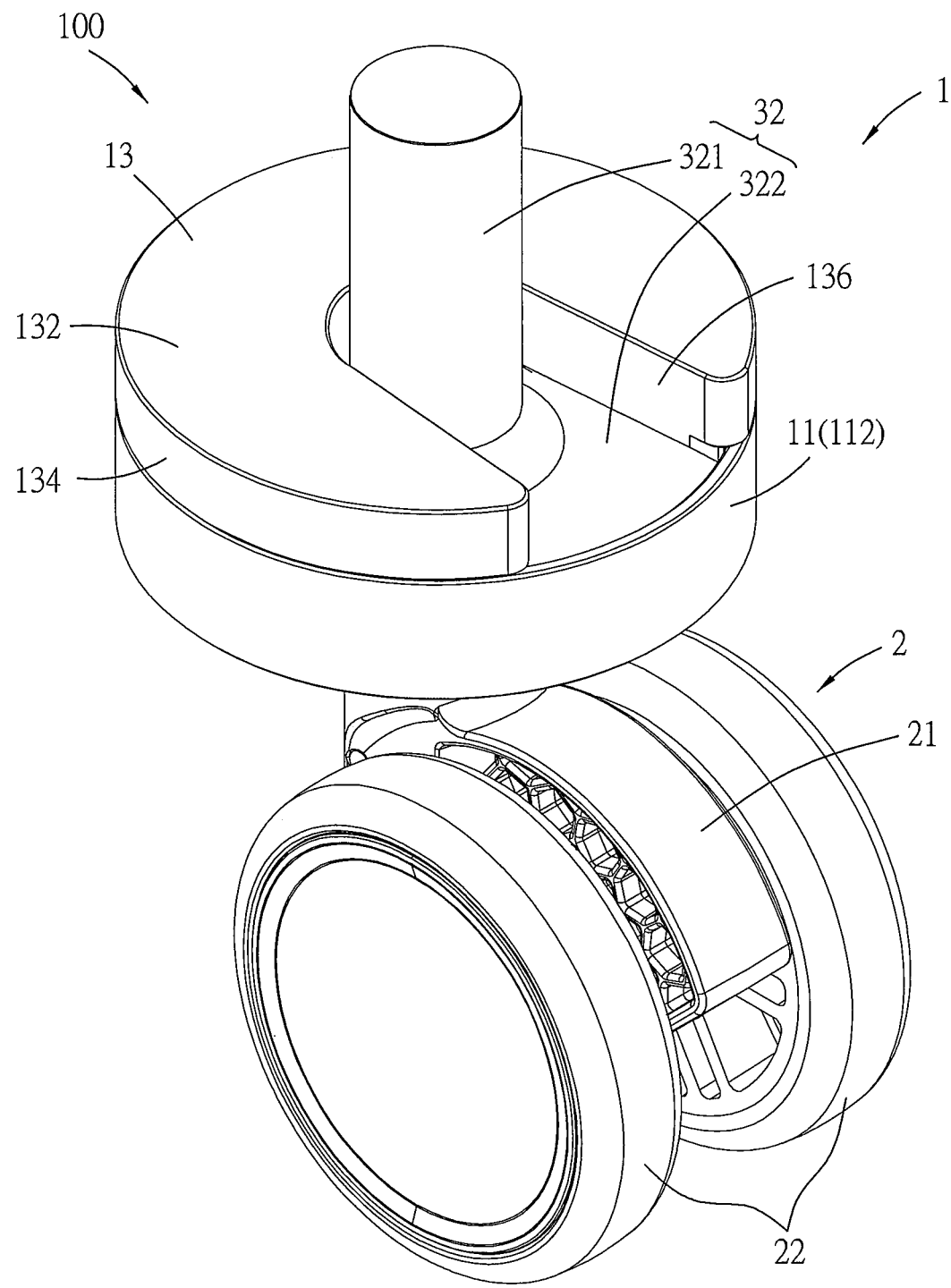
FIG. 2 is a perspective view illustrating one of the supporting assemblies.

Referring to FIGS. 1 and 2, a plurality of support assemblies 100 are provided for a frame 3, and each of the support assemblies 100 is shown to include a coupling mechanism 1 and a supporting element 2. The coupling mechanism 1 is provided for coupling the supporting element 2 to the frame 3, and includes a base member 11 and a C-shaped retainer 13. The frame 3 includes a frame body 31 and a plurality of leg members 32 each of which has a leg body 321 extending downwardly from the frame body 31 to terminate at an enlarged leg end 322.

Figure 3:
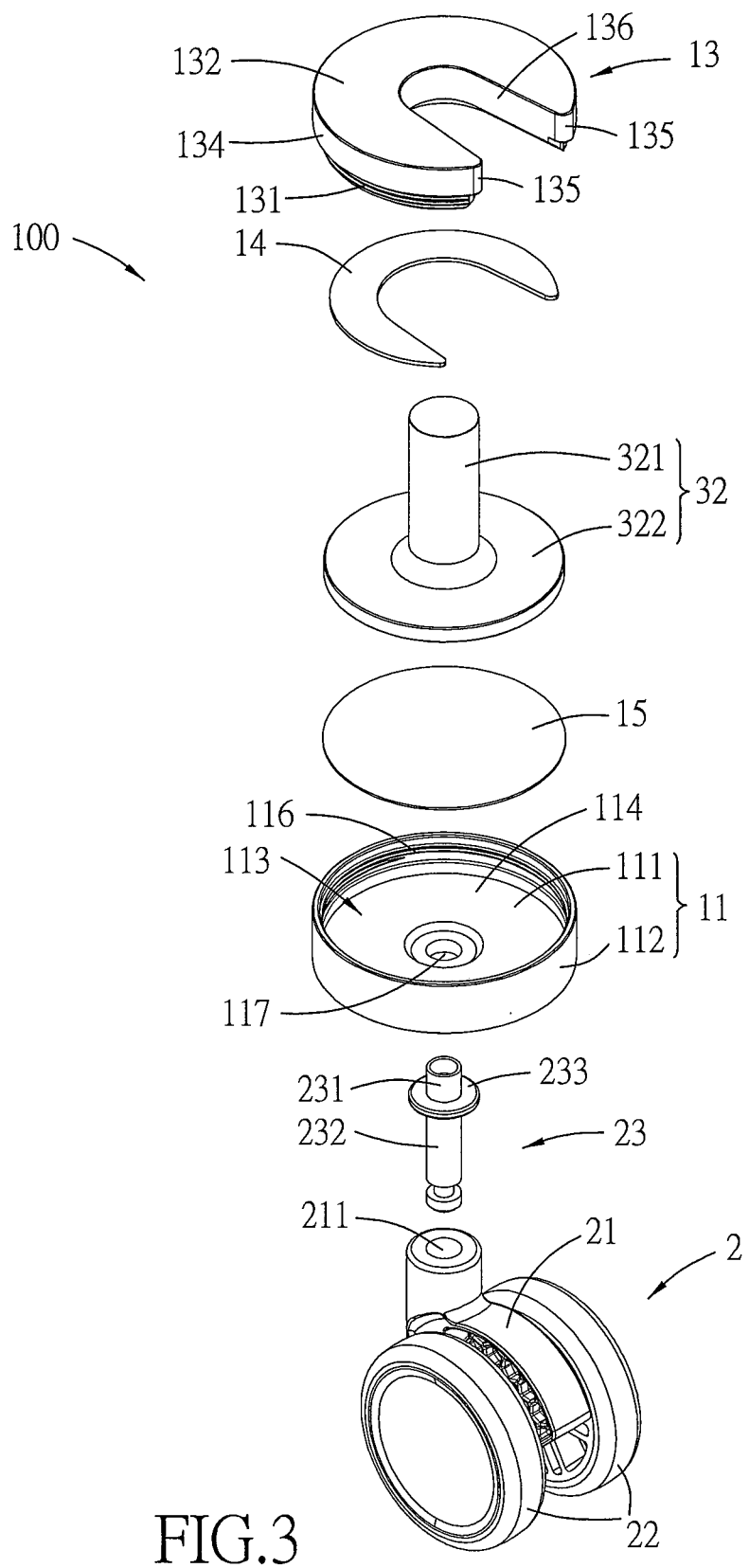
FIG. 3 is an exploded perspective view of FIG. 2.
Figure 4:
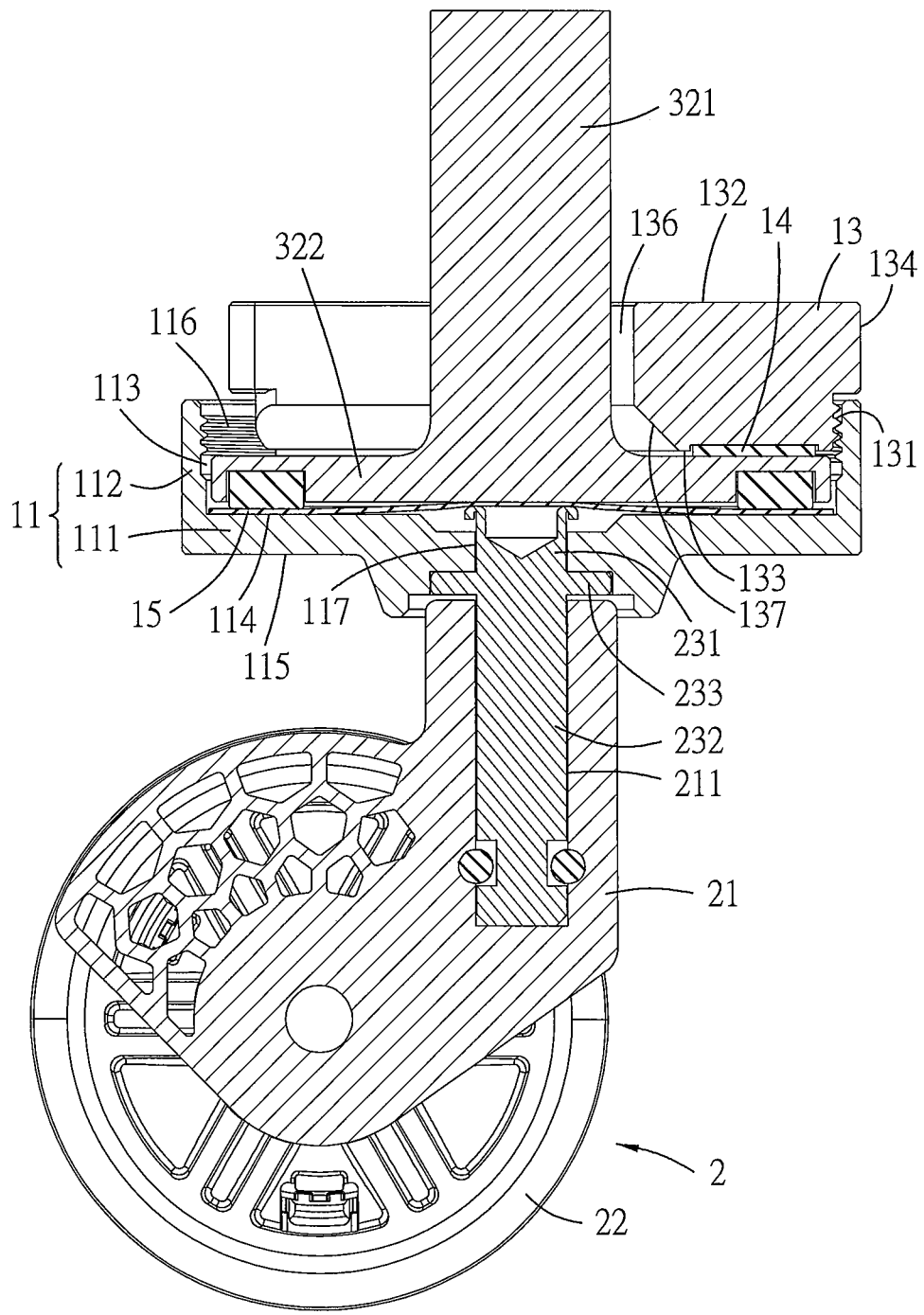
FIG. 4 is a cross-sectional view of FIG. 2.

As shown in FIGS. 2 to 4, the base member 11 includes a base wall 111 and a surrounding wall 112. The base wall 111 has an upper major surface 114 and a lower major surface 115 which is configured for being coupled to the supporting element 2. The surrounding wall 112 extends upwardly from a marginal edge of the upper major surface 114 of the base wall 111 to define a recess 113 with the base wall 111. The recess 113 is configured for receiving therein the enlarged leg end 322 of a respective one of the leg members 32. In an embodiment shown in FIGS. 3 and 4, the surrounding wall 112 may have an inner threaded surface portion 116, and the base wall 111 may have a through hole 117 extending from the lower major surface 115 to the upper major surface 114.

The C-shaped retainer 13 extends to be disposed about the leg body 321 of the respective leg member 32, and is configured to be detachably coupled to the surrounding wall 112 so as to retain the enlarged leg end 322 of the respective leg member 32 in the recess 113. In an embodiment shown in FIGS. 3 and 4, the C-shaped retainer 13 has an outer threaded surface portion 131 configured to be brought into threaded engagement with the inner threaded surface portion 116 of the surrounding wall 112 so as to permit the C-shaped retainer 13 to be detachably coupled to the surrounding wall 112.

In an embodiment shown in FIGS. 3 and 4, the C-shaped retainer 13 has an upper surface 132, a lower surface 133, an outer peripheral surface 134, an inner curved surface 136 and an inclined juncture surface 137. The outer peripheral surface 134 interconnects the upper and lower surfaces 132, 133, and has the outer threaded surface portion 131. The outer peripheral surface 134 extends circumferentially to terminate at two surface ends 135. The inner curved surface 136 extends between the surface ends 135 for being disposed about the leg body 321, and is disposed between the upper and lower surface 132, 133. The inclined juncture surface 137 extends downwardly and inclinedly from the inner curved surface 136 to the lower surface 133. With the provision of the inclined juncture surface 137, the respective leg member 32 may be prevented from being damaged by the C-shaped retainer 13 when the C-shaped retainer 13 is brought to couple with the surrounding wall 112.

In an embodiment shown in FIGS. 3 and 4, the coupling mechanism 1 may further include a C-shaped deformable washer 14 and a vibration absorbing washer 15. The C-shaped deformable washer 14 is mounted on the lower surface 133 of the C-shaped retainer 13 for being disposed between the C-shaped retainer 13 and the enlarged leg end 322 of the respective leg member 32, and may be made of a silicone rubber. The vibration absorbing washer 15 is for being disposed between the enlarged leg end 322 of the respective leg member 32 and the base wall 111, and may be made of a more rigid plastic material than the C-shaped deformable washer, such as Mylar. With the provision of the C-shaped deformable washer 14 and the vibration absorbing washer 15, the enlarged leg end 322 of the respective leg member 32 retained in the recess 113 of the base member 11 is positioned between the C-shaped deformable washer 14 and the vibration absorbing washer 15, and may be prevented from being damaged. In addition, with the provision of the vibration absorbing washer 15, the force from the respective leg member 32 may be evenly distributed on the base wall 111 of the base member 11.

Figure 5:
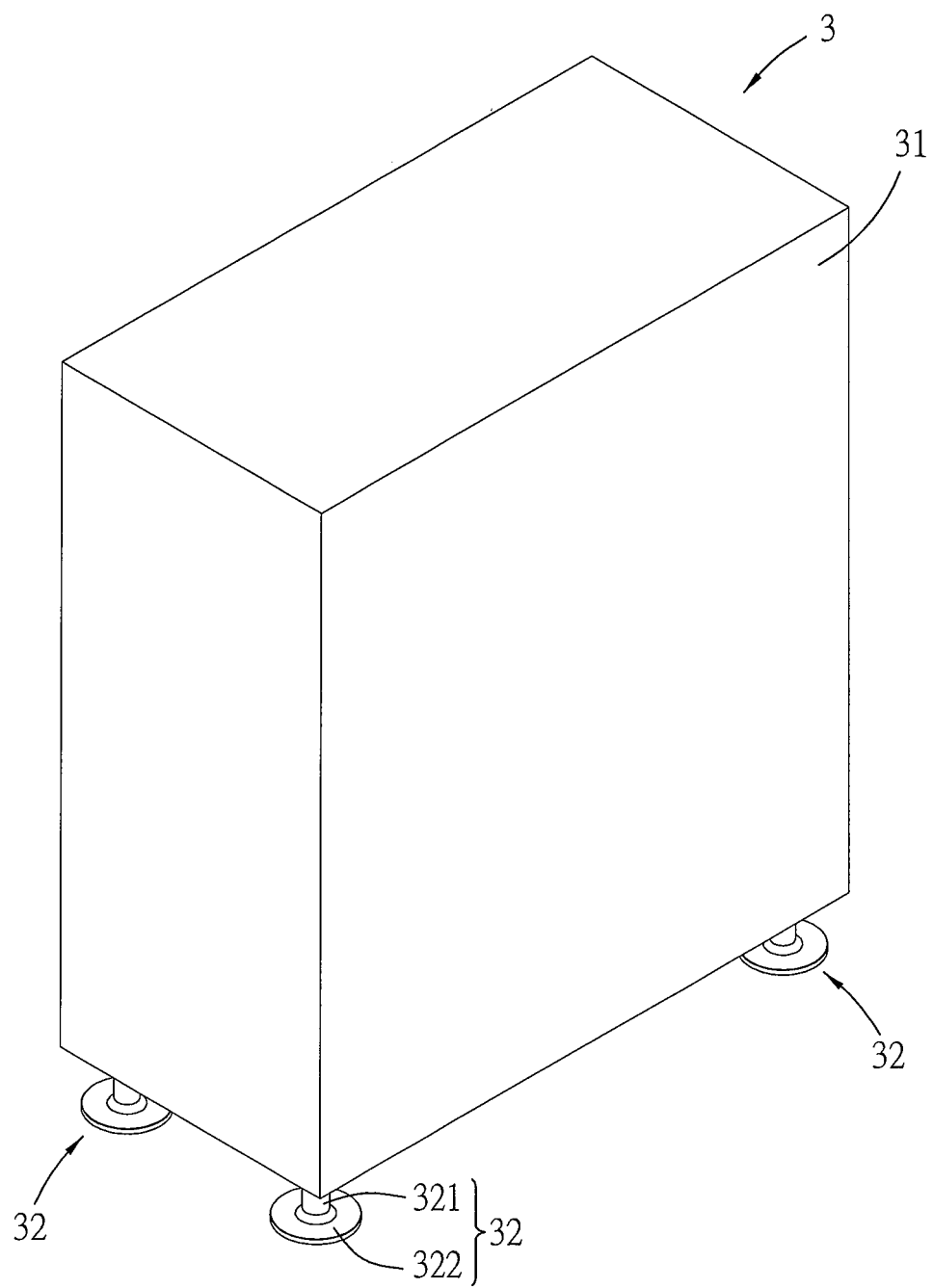
FIG. 5 is a perspective view similar to FIG. 1 but omitting the supporting assemblies.

In an embodiment shown in FIGS. 1 to 4, the supporting element 2 may include at least one caster wheel 22, and the frame 3 may be a computer case. Therefore, the frame 3 may be supported in two forms. In the first form, as shown in FIG. 1, the frame 3 has the caster wheels 22 of the supporting assemblies 100 mounted there beneath to facilitate movement of the frame 3. In the second form, as shown in FIG. 5, the frame body 31 of the frame 3 is only supported by the leg members 32. In other embodiments, the supporting element 2 may include an anti-slip pad, an anti-vibration pad, a suction cup, etc. The supporting element 2 may be provided for elevation and protection of the coupling mechanism 1.

In an embodiment shown in FIGS. 2 to 4, the supporting element 2 includes a caster mount 21 having an upper hole 211, two of the caster wheels 22, and a pintle 23. The caster wheels 22 are mounted at two opposite sides of the caster mount 21. The pintle 23 has an upper insert portion 231, a lower insert portion 232, and a radial flange 233. The upper insert portion 231 is configured to be inserted in the through hole 117 of the base wall 11 to permit the supporting element 2 to be coupled to the lower major surface 115 of the base wall 11. The lower insert portion 232 is configured to be inserted in the upper hole 211 of the caster mount 21. The radial flange 233 is disposed between the upper and lower insert portions 231, 232 so as to be disposed between the caster mount 21 and the base wall 11 once the upper and lower insert portions 231, 232 are respectively inserted in the through hole 117 and the upper hole 211.

In sum, with the provision of the supporting assembly 100, the supporting element 2 may be rapidly detached relative to the frame 3 without using any hand tools.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A coupling mechanism for coupling a supporting element to a frame which includes a frame body and a leg member that has a leg body extending downwardly from the frame body to terminate at an enlarged leg end, the coupling mechanism comprising:
   a base member including
      a base wall having an upper major surface and a lower major surface which is configured for being coupled to the supporting element, and
      a surrounding wall extending upwardly from a marginal edge of said upper major surface of said base wall to define a recess with said base wall, said recess being configured for receiving the enlarged leg end therein;
   a C-shaped retainer extending to be disposed about the leg body, and configured to be detachably coupled to said surrounding wall for retaining the enlarged leg end in said recess;
   wherein said surrounding wall has an inner threaded surface portion, and said C-shaped retainer has an outer threaded surface portion configured to be brought into threaded engagement with said inner threaded surface portion so as to permit said C-shaped retainer to be detachably coupled to said surrounding wall; and
   wherein said C-shaped retainer has
      an upper surface,
      a lower surface,
      an outer peripheral surface interconnecting said upper and lower surfaces, and having said outer threaded surface portion, said outer peripheral surface extending circumferentially to terminate at two surface ends,
      an inner curved surface which extends between said surface ends for being disposed about the leg body, and which is disposed between said upper and lower surface, and
      an inclined juncture surface extending downwardly and inclinedly from said inner curved surface to said lower surface.

2. The coupling mechanism according to claim 1, further comprising a C-shaped deformable washer which is mounted on a lower surface of said C-shaped retainer for being disposed between said C-shaped retainer and the enlarged leg end.

3. The coupling mechanism according to claim 1, further comprising a vibration absorbing washer for being disposed between the enlarged leg end and said base wall.

4. A supporting assembly for a frame which includes a frame body and a leg member that has a leg body extending downwardly from the frame body to terminate at an enlarged leg end, the supporting assembly comprising:
- a base member including
  - a base wall having an upper major surface and a lower major surface, and
  - a surrounding wall extending upwardly from a marginal edge of said upper major surface of said base wall to define a recess with said base wall, said recess being configured for receiving the enlarged leg end therein;
- a supporting element configured to be coupled to said lower major surface of said base wall; and
- a C-shaped retainer extending to be disposed about the leg body, and configured to be detachably coupled to said surrounding wall for retaining the enlarged leg end in said recess; and
- wherein said surrounding wall has an inner threaded surface portion, and said C-shaped retainer has an outer threaded surface portion configured to be brought into threaded engagement with said inner threaded surface portion so as to permit said C-shaped retainer to be detachably coupled to said surrounding wall;
- wherein said C-shaped retainer has
  - an upper surface,
  - a lower surface,
  - an outer peripheral surface interconnecting said upper and lower surfaces, and having said outer threaded surface portion, said outer peripheral surface extending circumferentially to terminate at two surface ends,
  - an inner curved surface which extends between said surface ends for being disposed about the leg body, and which is disposed between said upper and lower surface, and
  - an inclined juncture surface extending downwardly and inclinedly from said inner curved surface to said lower surface.

5. The supporting assembly according to claim 4, further comprising a C-shaped deformable washer which is mounted on a lower surface of said C-shaped retainer for being disposed between said C-shaped retainer and the enlarged leg end.

6. The supporting assembly according to claim 4, further comprising a vibration absorbing washer for being disposed between the enlarged leg end and said base wall.

7. The supporting assembly according to claim 4, wherein said supporting element includes at least one caster wheel.

8. The supporting assembly according to claim 4, wherein said base wall has a through hole extending from said lower major surface to said upper major surface, and said supporting element includes
- a caster mount having an upper hole,
- two caster wheels mounted at two opposite sides of said caster mount, and
- a pintle having
  - an upper insert portion configured to be inserted in said through hole of said base wall to permit said supporting element to be coupled to said lower major surface of said base wall,
  - a lower insert portion configured to be inserted in said upper hole of said caster mount, and
  - a radial flange disposed between said upper and lower insert portions so as to be disposed between said caster mount and said base wall once said upper and lower insert portions are respectively inserted in said through hole and said upper hole.

\* \* \* \* \*